(12) United States Patent
Nathan et al.

(10) Patent No.: US 10,169,684 B1
(45) Date of Patent: Jan. 1, 2019

(54) METHODS AND SYSTEMS FOR RECOGNIZING OBJECTS BASED ON ONE OR MORE STORED TRAINING IMAGES

(71) Applicant: INTELLI-VISION, San Jose, CA (US)

(72) Inventors: Vaidhi Nathan, San Jose, CA (US); Gagan Gupta, Delhi (IN); Nitin Jindal, Faridabad (IN); Chandan Gope, Derwood, MD (US)

(73) Assignee: IntelliVision technologies Corp., San Jose, CA (US)

( * ) Notice: Subject to any disclaimer, the term of this patent is extended or adjusted under 35 U.S.C. 154(b) by 0 days.

(21) Appl. No.: 15/179,966

(22) Filed: Jun. 10, 2016

Related U.S. Application Data

(60) Provisional application No. 62/235,587, filed on Oct. 1, 2015.

(51) Int. Cl.
| | |
|---|---|
| G06K 9/62 | (2006.01) |
| G06F 17/30 | (2006.01) |
| G06K 9/00 | (2006.01) |
| G06K 9/46 | (2006.01) |

(52) U.S. Cl.
CPC ....... *G06K 9/6276* (2013.01); *G06F 17/3079* (2013.01); *G06F 17/30247* (2013.01); *G06K 9/00744* (2013.01); *G06K 9/4604* (2013.01); *G06K 9/4647* (2013.01); *G06K 9/6218* (2013.01); *G06K 9/6256* (2013.01)

(58) Field of Classification Search
None
See application file for complete search history.

(56) References Cited

U.S. PATENT DOCUMENTS

| | | | |
|---|---|---|---|
| 4,977,603 A | * | 12/1990 | Irie ................ G06K 9/4647 358/462 |
| 5,742,037 A | | 4/1998 | Scola et al. |
| 7,412,427 B2 | | 8/2008 | Zitnick et al. |
| 7,627,170 B2 | | 12/2009 | Aboutalib et al. |
| 8,036,468 B2 | | 10/2011 | Chrysanthakopoulos |
| 8,406,522 B1 | | 3/2013 | Owechko et al. |
| 8,625,887 B2 | | 1/2014 | Li et al. |
| 8,625,902 B2 | | 1/2014 | Baheti et al. |
| 8,705,866 B2 | | 4/2014 | Zhang et al. |
| 9,020,246 B2 | | 4/2015 | Li et al. |
| 9,195,898 B2 | | 11/2015 | Huang et al. |

(Continued)

FOREIGN PATENT DOCUMENTS

| | | |
|---|---|---|
| EP | 2836964 A1 | 2/2015 |
| EP | 2921989 A1 | 9/2015 |

(Continued)

OTHER PUBLICATIONS

Kristen Grauman, Visual Object Recognition.

*Primary Examiner* — Soo Shin
(74) *Attorney, Agent, or Firm* — Unisha Patel; Mohamed Azeez

(57) ABSTRACT

The present invention discloses methods and systems for recognizing an object in an input image based on stored training images. An object recognition system the input image, computes a signature of the input image, compares the signature with one or more stored signatures and retrieves one or more matching images from the set of training images. The matching images are then displayed to the user for further action.

19 Claims, 10 Drawing Sheets

(56) References Cited

U.S. PATENT DOCUMENTS

| | | |
|---|---|---|
| 9,508,151 B2 | 11/2016 | Romanik et al. |
| 9,558,426 B2 | 1/2017 | Song et al. |
| 9,594,942 B2 | 3/2017 | Saklatvala |
| 2006/0204107 A1 | 9/2006 | Dugan et al. |
| 2007/0009159 A1 | 1/2007 | Fan |
| 2008/0112593 A1 | 5/2008 | Ratner et al. |
| 2009/0048842 A1 | 2/2009 | Albrecht et al. |
| 2009/0324026 A1* | 12/2009 | Kletter ............... G06K 9/00442 382/124 |
| 2010/0166303 A1 | 7/2010 | Rahimi |
| 2012/0288167 A1* | 11/2012 | Sun .................... G06K 9/00281 382/118 |
| 2013/0058535 A1* | 3/2013 | Othmezouri ....... G06K 9/00369 382/103 |
| 2013/0089260 A1* | 4/2013 | Pires .................... G06K 9/4619 382/190 |
| 2013/0223737 A1* | 8/2013 | Anbai .................. G06K 9/4671 382/170 |
| 2015/0078629 A1* | 3/2015 | Gottemukkula ..... G06K 9/0061 382/117 |
| 2016/0342863 A1 | 11/2016 | Kwon et al. |

FOREIGN PATENT DOCUMENTS

| | | |
|---|---|---|
| WO | 2008113780 A1 | 9/2008 |
| WO | 2015167594 A1 | 11/2015 |
| WO | 2015125025 A3 | 12/2015 |

* cited by examiner

Object Recognition System

Exemplary Snapshot 1
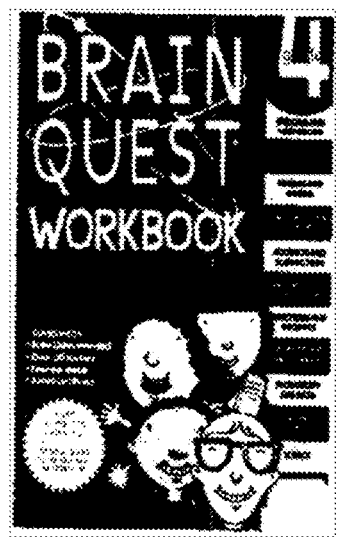
602
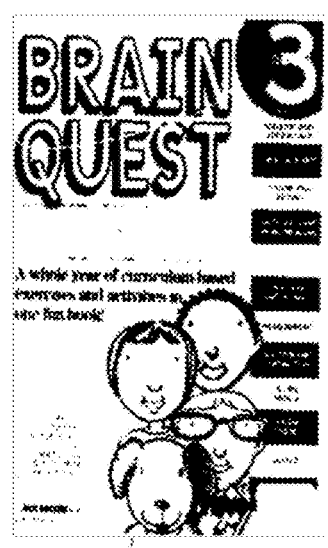
604
FIG. 6

METHODS AND SYSTEMS FOR RECOGNIZING OBJECTS BASED ON ONE OR MORE STORED TRAINING IMAGES

TECHNICAL FIELD

The disclosure generally relates to the field of object recognition, and in particular, the disclosure relates to methods and systems for recognizing objects based on one or more stored training images.

BACKGROUND

In the last few years, image recognition has gained considerable traction, thus, growing at a very fast pace. Image recognition technologies play a huge role in connecting the real world to computing devices—a smart phone is one such popular example. These technologies have footprints in every field such as face recognition, gaming, e-commerce, security and surveillance, content management, augmented reality, image searching and many others. The usage of Internet and smart phones has expanded the role of image recognition technologies in day-to-day lives of users as well as in businesses. With the use of smart phones, the users are able to recognize objects around them during online/offline browsing activities and even in real-life events. Online/Offline browsing activities may include, but are not limited to, surfing over pop culture websites or social media platforms, performing purchase activities on e-commerce websites, searching images stored on the smart phones, and the like. Further, examples of real-life events that may require use of image processing may include—scanning a product in a store aisle, scanning the RFID (Radio-Frequency Identification) or QR (Quick Response) codes of items or articles, or the like. A few examples of these objects include people, buildings, places, wine labels, books, albums, covers, apparels, and the like.

Companies are also leveraging this technology in many ways. For instance, companies can see how their logos/trademarks are being used, i.e., companies can identify trademark infringement and unauthorized usage. Many businesses focus on increasing ROI (Return on Investment) on their marketing budgets. For example, retailers are enhancing their consumers' shopping experiences by allowing them to scan a product's code and receive a list of similar products, and enabling them to directly buy products of their choice from their smart phones. In another example, the technology is being used to get coupons, price matching details, discount offers, etc. These are just a few examples and there are many more additions when it comes to implementing the image recognition technology.

Speed and accuracy are two main considerations for image recognition solution providers. The average users of this technology don't want to wait for more than 3-4 seconds and they also want accurate results. Although there are a number of products and applications available in the market for identifying objects in an image or images, the existing solutions have issues related to accuracy and scalability. Further, these solutions are not robust enough to identify products under various geometric and photometric transformations. Additionally, the solutions are not scalable enough to search millions of images in real-time. Therefore, there is a need for efficient and accurate ways for recognizing objects in images.

SUMMARY

An embodiment of the disclosure discloses an object recognition system. The object recognition system comprises a processor, a non-transitory storage element coupled to the processor, encoded instructions stored in the non-transitory storage element, the encoded instructions when implemented by the processor, configure the object recognition system to generate a signature for an input image of the object by an image signature generation unit, wherein the image signature generation unit comprises a feature detection unit and a feature description unit. The feature detection unit is configured to detect one or more feature points in the input image. The feature description unit is configured to compute a description for each feature point of the one or more feature points, wherein the feature description unit is further configured to: identify a dominant gradient direction in a region around the feature point, wherein an angle of the dominant gradient direction is $\alpha$; center a patch around the feature point, wherein the patch is tilted at the angle $\alpha$; divide the patch in R segments; compute a vector of length N for each segment of the R segments, wherein the vector is computed based on a horizontal gradient (dx) and a vertical gradient (dy) corresponding to each pixel in the segment; compute a consolidated vector of length R*N by consolidating vectors computed for all the R segments; compute a byte vector of length R*N, wherein the byte vector is computed by normalizing the consolidated vector, wherein the byte vector is the description of the feature point, whereby the signature of the input image comprises description corresponding to each of the one or more feature points in the input image. The object recognition system is configured to store a set of training images in a data storage, wherein each training image of the set of training images is associated with one or more training feature descriptors. The data storage further comprises an index mapping unit that is configured to create an index mapping based on training feature descriptors. The object recognition system is configured to identify a matching image of the set training images by a search engine by comparing the signature of the input image with the training feature descriptors using the index mapping.

An embodiment of the disclosure discloses an image signature generation unit. The image signature generation unit comprises a processor, a non-transitory storage element coupled to the processor, encoded instructions stored in the non-transitory storage element, the encoded instructions when implemented by the processor, configure the image signature generation unit to detect one or more feature points in the image by a feature detection unit. The image signature generation unit is further configured to compute a description for each feature point of the one or more feature points by a feature description unit is configured, wherein the feature description unit is further configured to: identify a dominant gradient direction in a region around the feature point, wherein an angle of the dominant gradient direction is $\alpha$; center a patch around the feature point, wherein the patch is tilted at the angle $\alpha$; divide the patch in R segments; compute a vector of length N for each segment of the R segments, wherein the vector is computed based on at least a horizontal gradient (dx) and at least a vertical gradient (dy) corresponding to each pixel in the segment; compute a consolidated vector of length R*N by consolidating vectors computed for all the R segments; and compute a byte vector of length R*N, wherein the byte vector is computed by normalizing the consolidated vector, wherein the byte vector is the description of the feature point, whereby the signature of the image comprises description corresponding to each of the one or more feature points in the image.

An additional embodiment describes a method for recognizing an object in one or more input images based on one or more training images stored in a data storage. The method comprises generating a signature for an input image of the object comprising, wherein the generation includes the steps of: detecting one or more feature points in the input image; and computing a description for each feature point of the one or more the feature points. The description computation comprises: identifying a dominant gradient direction in a region around a feature point, wherein an angle of the dominant gradient direction is α; centering a patch around the feature point, wherein the patch is tilted at the angle α; dividing the patch in R segments; computing a vector of length N for each segment of the R segments, wherein the vector is computed based on at least a horizontal gradient (dx) and at least a vertical gradient (dy) corresponding to each pixel in the segment; computing a consolidated vector of length R*N by consolidating vectors computed for all the R segments; and computing a byte vector of length R*N, wherein the byte vector is computed by normalizing the consolidated vector, wherein the byte vector is the description of the feature point, whereby the signature of the input image comprises description corresponding to each of the one or more feature points in the input image. Additionally, the method includes the step of identifying a matching image of the set training images by comparing the signature of the input image with the one or more training feature descriptors using the index mapping.

BRIEF DESCRIPTION OF DRAWINGS

FIG. 6 shows a snapshot indicating images of similar looking products.

DETAILED DESCRIPTION OF DRAWINGS

The present invention will now be described more fully with reference to the accompanying drawings, in which embodiments of the invention are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

Overview

The primary purpose of the disclosure is to enable devices/machines/systems to understand the content of images/videos thus leading to object/product identification. The present disclosure focuses on recognizing an object in an image based on the object's visual appearance, more specifically, the disclosure discloses methods and systems for recognizing an object in an image based on one or more training images. Here, the image is compared to the one or more previously stored different training images of the object. The disclosure can be implemented for any object which offers/includes visual features that can be used for recognition purposes. Some examples of the objects are, but not limited to, packaged retailed items, books, apparels, toys, CDs and DVDs. However, for a person skilled in the art it understood these examples are just for understanding purposes and the disclosure can be implemented for any types of objects.

Exemplary Environment

Figure 1:
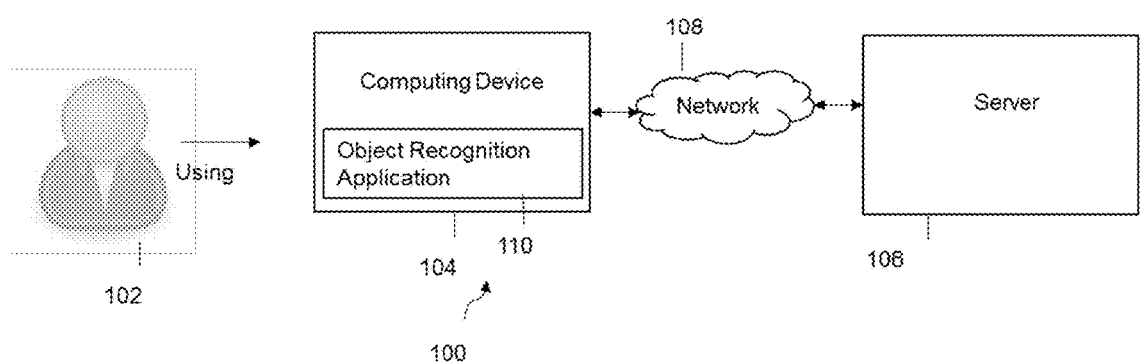
FIG. 1 illustrates an exemplary environment in which various embodiments of the disclosure can be practiced.

FIG. 1 illustrates an exemplary environment 100 in which various embodiments of the present invention can be practiced. The environment 100 includes a user 102, a computing device 104 that includes an object recognition application 110, and a server 106. The computing device 104 is communicatively coupled to the server 106 over a network 108.

As shown, the computing device 104 refers to any electronic device which is capable of sending, receiving and processing information. Examples of the computing device 104 include, but are not limited to, a smart phone, a mobile device/phone, a Personal Digital Assistant (PDA), a computer, a workstation, a notebook, a mainframe computer, a laptop, a tablet, an internet appliance and any equivalent device capable of processing, sending and receiving data. The user 102 uses the computing device 104 for his day-to-day tasks such as emails, internet surfing, games, social networking, or the like. In the context of the present invention, the user 102 uses the computing device 104 for recognizing one or more objects in an input image. To this end, the object recognition application 110 running on the computing device 104 enables the user 102 to recognize the objects. The object recognition application 110 may be in the form of a website or a mobile application. In cases where the computing device 104 is a laptop, or a computer, the object recognition application 110 may be in the form a website. While in cases where the computing device 104 is a smart phone, the object recognition application 110 may be in the form of a mobile application.

The object recognition application 110 is an application for recognizing/identifying an object in an input image based on one or more training images stored on the server 106. In particular, the object recognition application 110 facilitates a user interface and a back-end interface (although not shown in FIG. 1). The user interface enables the user 102 to perform one or more functions such as uploading the input image, initiating a search, viewing matching images and viewing additional information related to the matching images. While the back-end interface is coupled to the server 106 through the network 108 for processing the input image and identifying relevant matching images.

As shown, the server 106 is a device capable of processing information received from the user 102 or the computing device 104. Other functionalities of the server 106 include providing a data storage, computing, communicating and searching. In the context of the present invention, the server 106 processes the input image and identifies one or more matching images. Specifically, the server 106 receives the input image, computes a signature of the input image, compares the signature with one or more stored signatures and retrieves one or more matching images from a set of training images. The matching images are then sent back to the user 102 and displayed through the user interface of the object recognition application 110.

Once a matching image is received, the user 102 may take an action on the matching image such as performing a purchase activity, sharing with other users over an online platform (such as social media) and reviewing additional information associated with the matching image. The action may be based on the type of input image. For example, if the input image is of a footwear, the user may perform the action of purchase, but if the input image is of a person, the user may perform the action of posting the matching image on social media platforms. More details will be discussed in conjunction with the subsequent figures.

As indicated, the network 108 may be any suitable wired network, wireless network, a combination of these or any other conventional network, without limiting the scope of the disclosure. Few examples may include a LAN or wireless LAN connection, an Internet connection, a point-to-point connection, or other network connection and combinations thereof. The network 108 may be any other type of network that is capable of transmitting or receiving data to/from host computers, personal devices, telephones or any other electronic devices. Further, the network 108 is capable of transmitting/sending data between the mentioned devices. Additionally, the network 108 may be a local, regional, or global communication network, for example, an enterprise telecommunication network, the Internet, a global mobile communication network, or any combination of similar networks. The network 108 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 108 may include any software, hardware, or computer applications that can provide a medium to exchange signals or data in any of the formats known in the art, related art, or developed later.

Figure 2:
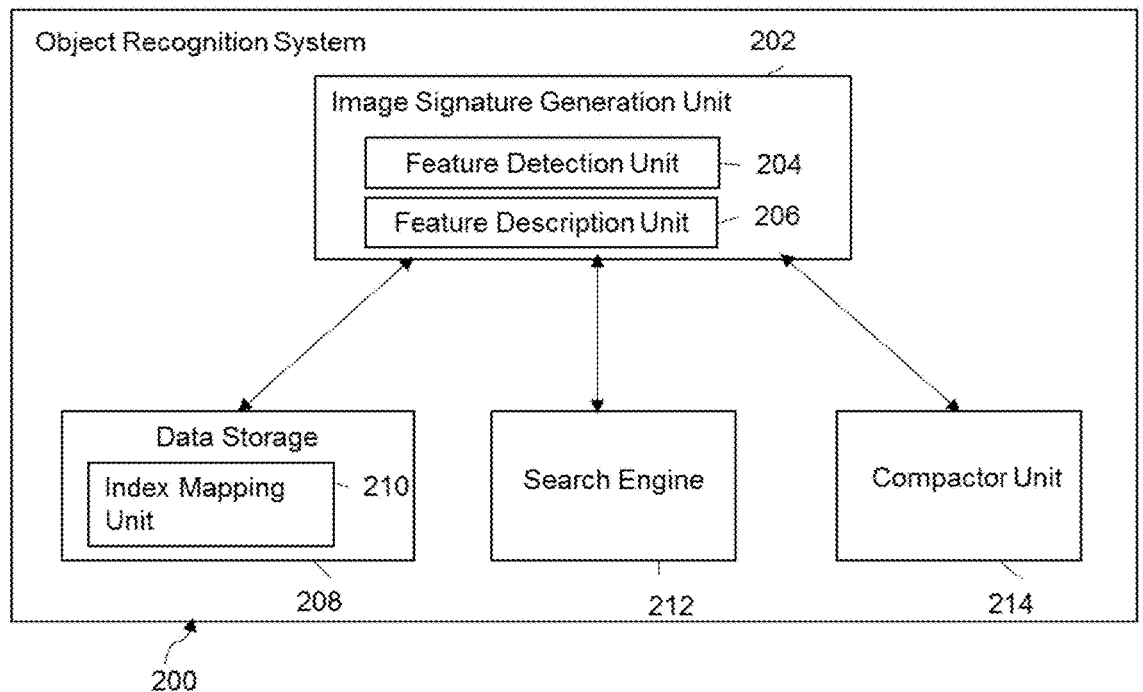
FIG. 2 shows various components of an object recognition system, according to an embodiment of the disclosure.

It is understood that the object recognition functionality is defined with respect to an application (as in FIG. 1), while the object recognition functionality may be defined in terms of a system (see FIG. 2). In some embodiments, the object recognition functionality can be performed by the server 106, while in other embodiments, the object recognition functionality can be performed by the computing device 104. Further in the remaining embodiments, the object recognition functionality can be performed partly by the server 106 and partly by the computing device 104.

Exemplary Object Recognition System

FIG. 2 illustrates various components of an object recognition system 200. The object recognition system 200 facilitates recognition of an object in an input image based on one or more stored training images.

As illustrated, the object recognition system 200 includes an image signature generation unit 202, a data storage 208, a search engine 212 and a compactor unit 214. The image signature generation unit 202 includes a feature detection unit 204 and a feature description unit 206. The data storage 208 includes an index mapping unit 210. Each of the shown components communicate with each other using conventional protocols such as the bus protocol. The components 202-214 shown here are exemplary and are for understanding purposes, but for a person skilled in the art, it is understood that the object recognition system 200 may have one or more additional components for performing the required functions of object recognition. While in other embodiments, the components may be combined/integrated to perform the required functions of object recognition. While describing the drawings, references to other figures/elements may be made.

In an embodiment of the present invention, the components 202-214 may be in the form of hardware components, while in another embodiment, the components 202-214 may be in the form of software entities/modules. In yet another embodiment of the present invention, the components may be a combination of hardware and software modules.

The object recognition system 200 may be a part of at least one of the group comprising a mobile phone, a computer, a server or a combination thereof.

Image Input Unit

Figure 5:
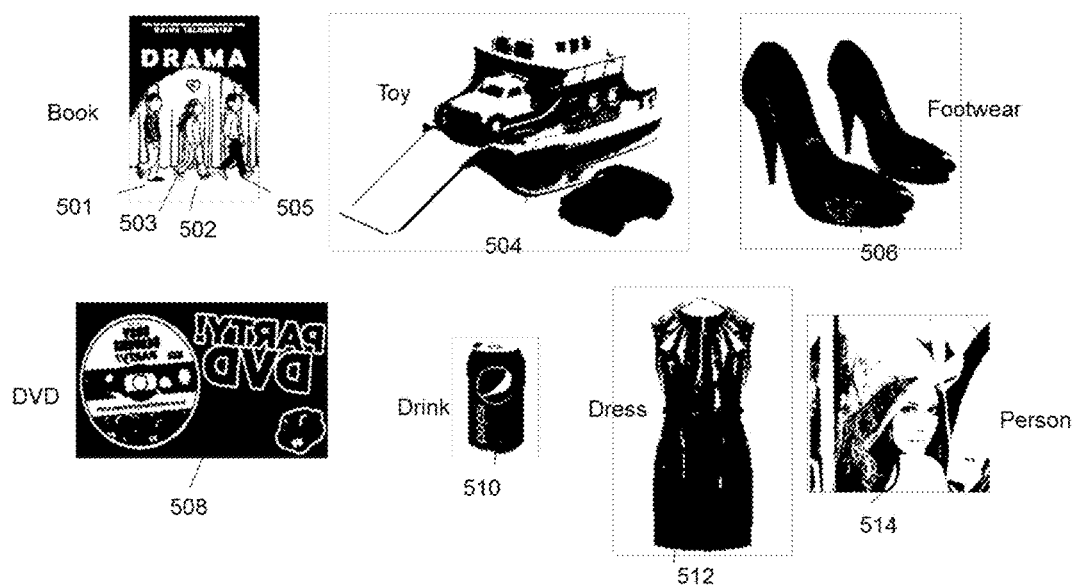
FIG. 5 shows exemplary input images according to an embodiment.

The object recognition system 200 includes an image input unit (not shown) that enables the user 102 to provide an input image of an object to the object recognition system 200. Examples of the object include, but are not limited to clothing, footwear, an accessory, a book, a CD, a DVD, an artwork, a game and a food item. Other examples of the object include, but are not limited to, a person, a logo, a trademark and a building. A few examples of the object, shown in FIG. 5, are a book 502, a toy 504, a footwear 506, a DVD 508, a drink 510, a dress 512, and a person 514.

The input image may be at least one of an image, a video and a piece of multimedia. If the input image is a video, each frame of the video is considered an input image to capture the object to be recognised.

The input image may be in at least one of the formats of the group comprising PDF, PCD, PSD, EPS, JPEG, JPG, JIF, JFIF, TIF, TIFF GIF, BMP, PNG, MOV, OGG, WMV, FLV, MP4, MPEG, AVI, QT and ARF. Further, the input image may be of any size, color, or length (in case of videos/multimedia).

In an embodiment of the present invention, the image input unit includes a user interface that enables the user to provide the input image to the object recognition system 200. Through the user interface, the user may either upload a previously stored image as the input image or capture/scan a new image that is provided to the object recognition system 200 as the input image. For example, when the image input unit is a part of a mobile phone, the image input unit allows the user 102 to use the camera of the mobile phone to capture an image and provide the image as the input image to the object recognition system 200.

In another embodiment of the present invention, the image input unit enables the user to select an image being displayed on a website or a mobile app and provide the image as the input image to the object recognition system 200.

Image Signature Generation Unit 202

The image signature generation unit 202 is configured to generate a signature for the input image. The image signature generation unit 202 includes the feature detection unit 204 and the feature description unit 206. Each of these will be discussed in detail below.

Feature Detection Unit 204

Feature detection unit 204 receives the input image from the image input unit. On receiving the input image, the feature detection unit 204 detects one or more feature points in the input image. Feature points of an image help distinguish the image from other images. Examples of the feature points include, but are not limited to, edges, corners, interest points, ridges and blobs.

The one or more feature points in the input image as detected by the feature detection unit 204 are robust to variations in illumination and view point changes such as rotation, translation, scaling, sheer and perspective distortions.

In an embodiment of the present presentation, the feature detection unit 204 may apply at least one algorithm of the group comprising FAST, GLOH, SIFT, SURF, BRISK and ORB to the input image for detecting the one or more feature points.

Feature Description Unit 206

The feature description unit 206 receives the one or more feature points detected by the feature detection unit 204 and is configured to compute a description for each feature point of the one or more feature points. The description of the feature point is a mathematical description to encode the appearance and visual information of the feature point. The description should be robust to illumination and viewpoint variations, efficient to compute, and small in size for efficient indexing and matching.

To begin with, the feature description unit 206 identifies a dominant gradient direction in a region surrounding the feature point. The angle of the dominant gradient direction is alpha (a). In an embodiment of the present invention, the value of alpha ($\alpha$) may be in the range of 0-180 degrees. A square patch of size H*H, rotated by angle $\alpha$ is centred on the feature point by the feature description unit 206. The square patch H*H is used as the region for computing the description for the feature point. In an example, H may be defined in terms of number of pixels. It is apparent to a person ordinarily skilled in the art that the shape of the region used for computing the description may be other than a square.

Further, the feature description unit 206 computes the description on this H*H patch using sum of gradients. The feature description unit 206 divides the H*H patch into R segments, where R is any positive integer. A horizontal gradient i.e., dx and a vertical gradient i.e., dy are computed for all the pixels in the H*H patch. For each of the R segments, a vector of length N is computed. For example, when the value of N is 4, the vector is (sum (dx), sum (dy), sum (abs (dx)), sum (abs (dy))). In all, the feature description unit 206 computes a vector of length N*R for all the R segments. This vector is normalized using L2 norm to get the normalized vector V. The normalized vector V has real values in the range of [0, 1]. The vector is then multiplied by 255 and rounded off to get a byte vector of length N*R, where each element of the vector is an integer in the range [0, 255]. Here, the byte vector is used as the description for the feature point. Similarly, feature descriptions are computed for all the feature points detected in the input image of the object. The combination of all the feature descriptions corresponding to the one or more feature points detected in the input image is referred to as the signature of the input image.

Compactor Unit 214

The compactor unit 214 is configured to compact the size associated with the description of the feature point. Here, the size corresponds to the amount of memory required to store the description of the feature point. In an embodiment of the present invention, the compactor unit 214 uses at least one of algorithms of the group comprising auto encoding, K-mean clustering, histogram compression, tree coding and entropy encoding to compact the size of the description of the feature point. As indicated in FIG. 2, the compactor unit 214 is a part of the object recognition system 200. However, in many embodiments, the compactor unit 214 may be a part of the feature description unit 206 or the functionality of the compactor unit 214 may be integrated within the feature description unit 206.

Data Storage 208

The data storage 208 is configured to store a set of training images that are used for object recognition. Along with these training images, the data storage 208 may be configured to store related information such as feature descriptors of the training images i.e. training feature descriptors and additional information for the training images. For example, when a training image includes a book, the additional information includes availability in stores, price and discount offers relevant to the book. In another example, when the training image includes a building, the additional information includes address, contact details, location of the building on a map, history of the building and the builder of the building.

Index Mapping Unit 210

The number of training feature descriptors may be extremely large for millions of training images, therefore, there is a need to limit the number of training feature descriptors. One way to limit the number of the training feature descriptors is to use vector quantization techniques such as bag-of-words technique. To match the input image with the set of training images in the data storage 208, a closest match for each feature description of the input image is identified against the training feature descriptors. An exhaustive matching with each training feature descriptor may take a long time and the system may not be scalable. Hence, instead of finding the closest match, the present invention focuses on approximating the match by searching for an approximately closest match. This is performed using index mapping techniques and these will be discussed below.

The index mapping unit 210 creates an index mapping in order to speed up identifying a matching image among the set of training images for the input image.

The index mapping unit 210 creates the index mapping based on the training feature descriptors. The index mapping is created in at least one format of an array, a hash table, a lookup table and a k-dimensional (k-d) tree. In one example, k-d tree is created based on the training feature descriptors and a selected dimension along which the split may be made at a given node in the k-d tree. In an embodiment of the present invention, a dimension with maximum variance is selected as the dimension along which the split is made in the k-d tree. In another embodiment of the present invention, the dimension is selected based on its relevance such as the ordering of feature detection. This k-d tree is then used to identify nearest neighbors with respect to the signature of the input image. Multiple such trees may be created to improve the accuracy of nearest neighbor identification.

To make the data storage 208 scalable, the present invention describes improvements that are applied to index mapping using the k-d tree. The k-d tree is pruned such that each leaf may have up to P training feature descriptors. In an example, the value of P is 16. Pruning reduces the size of the k-d tree by several times. In this manner, the present invention facilitates fitting a k-d tree of 1 billion training feature descriptions in a memory of size 12 GB.

Search Engine 212

The search engine 212 is configured to process the signature of the input image received from the user 102 or from the computing device 104. In particular, the search engine 212 performs matching of the input image with the set of training images stored in the data storage 208. The search engine 212 performs the matching in two stages—a)

sparse matching and b) dense matching; these will be discussed below in detail. Splitting the matching into two stages facilitates fast matching against millions of training images as stored in the data storage 208.

In an embodiment of the present invention, the search engine 212 processes the input image based on a query from the user 102. For example, if the user 102 wishes to receive discounts, offers and coupons relevant to the object in the input image, the search engine 212 identifies a matching image among the set of training images and provides the relevant discounts, offers and coupons. In another example, if the user 102 wishes to perform price comparison from different sellers for a product in the input image, the searches engine 212 identifies a matching image from the set of training images and provides a table with prices from different sellers.

Sparse Matching

Once the signature of the input image is computed by the feature description unit 206, the search engine 212 performs the first stage of matching called sparse matching. Given the feature descriptions of the input image, the search engine 212 identifies a set of matching training feature descriptors based on the index mapping. Training images with counts for matching training feature descriptors higher than a first pre-defined threshold are considered as candidate matches. These candidate matches are called as sparse matches. The top K sparse matches (with the highest counts for matching training feature descriptors) are selected for dense matching.

Dense Matching

The search engine 212 is configured to perform dense matching that uses a scoring mechanism to find the best match for the input image. The feature descriptions of the input image are densely matched using spatial consistency with each of the sparse matches to compute a matching score.

In an embodiment of the present invention, the search engine 212 is configured to compare the signature of the input image with the training feature descriptors of a sparse match to compute a one-to-one feature mapping. The feature mapping along with location of feature points in the sparse match is used to compute a transformation T between the input image and the sparse match. Feature points of the sparse match that are outliers in the transformation T are discarded. The count of feature points in the sparse match that are inliers in the transformation T are used as the matching score for the sparse match with respect to the input image. Similarly, matching scores are calculated for all sparse matches identified during sparse matching. Sparse matches having matching scores higher than a second pre-defined threshold are considered dense matches. A dense match with the highest matching score is the matching image/best match for the input image.

Verification

Many objects/products are visually similar such as books from the same author or books in a series. One such example is shown in FIG. 6. The snapshot shows an image 602 that is visually similar to an image 604. These books may have feature descriptors that are exactly the same. For example, these similar features descriptors may vary from 10-80% for such products shown in FIG. 6. If the number of such similar looking training images is high in the data store 208, the matching image (identified using dense matching) may be a similar looking image and not an exact match to the input image. To resolve this, the object recognition system 200 is configured to cluster similar looking training images in Similar Image Clusters (SICs). If a dense match is a part of an SIC, all images in that SIC are considered as candidates for matching with the input image. In case the SIC is small, dense matching is applied to get a matching score for each of the training images in the SIC. However, when the SIC is big, sparse matching is applied to the training images in the SIC, followed by dense matching for sparse matches.

In an embodiment of the present invention, the SICs are created by the data storage 208 based on identifiers associated with the objects. For example, in case of books, ISBN numbers are used to create SICs. In another embodiment, the SICs are created based on barcodes associated with the objects. In yet another embodiment, the SICs are created based using machine learning algorithms.

Temporal Verification

The object recognition system 200 is configured to perform temporal verification when the input image is a frame in a video. In an embodiment of the present invention, the object recognition system 200 is configured to analyse matching images for F continuous frames in the video to check if the matching images are consistent over time.

Display

After one or more matching images for the input image are identified by the search engine 212, the search engine sends the one or more matching images to the computing device 104.

In an embodiment of the present invention, the one or more matching images are displayed along with the additional information such as price and shipping cost, description, reviews and video or audio clips. This may enable the user 102 to make a purchase of the object in the input image from a retailer. In another embodiment of the present invention, the user 102 shares the one or more matching images on a social networking platform.

In an embodiment of the present invention, the object recognition system 200 is implemented at the server 106, while in another embodiment, the object recognition system 200 is implemented at the computing device 104. In yet another embodiment, a part of the object recognition system 200 is implemented at the computing device 104, while another part is implemented at the server 106. For example, feature detection and description are performed at the computing device 104, while the remaining functions such as indexing, sparse matching, dense matching, verification, and temporal verification are performed at the server 106.

In an embodiment of the present invention, the object recognition system 200 is configured to handle scenarios where the input image is of low resolution, occlusion, glare, color changes, rotation, skews and many other transformations.

In an embodiment of the present invention, the object recognition application may vary based on the usage or the requirement of the users. For example, the object recognition app for identifying coupons, offers and discounts for a product, may be different from an app for identifying information such as reviews, sales, availability in shops where the product is stocked for sale and price about the products. In some embodiments, the object recognition app may be a single app with all functionalities such as allowing the user 102 to buy and share products, as well as view information such reviews, coupons, offers, and discounts relevant to the products.

Exemplary Method Flowchart—Object Recognition

Figure 3:
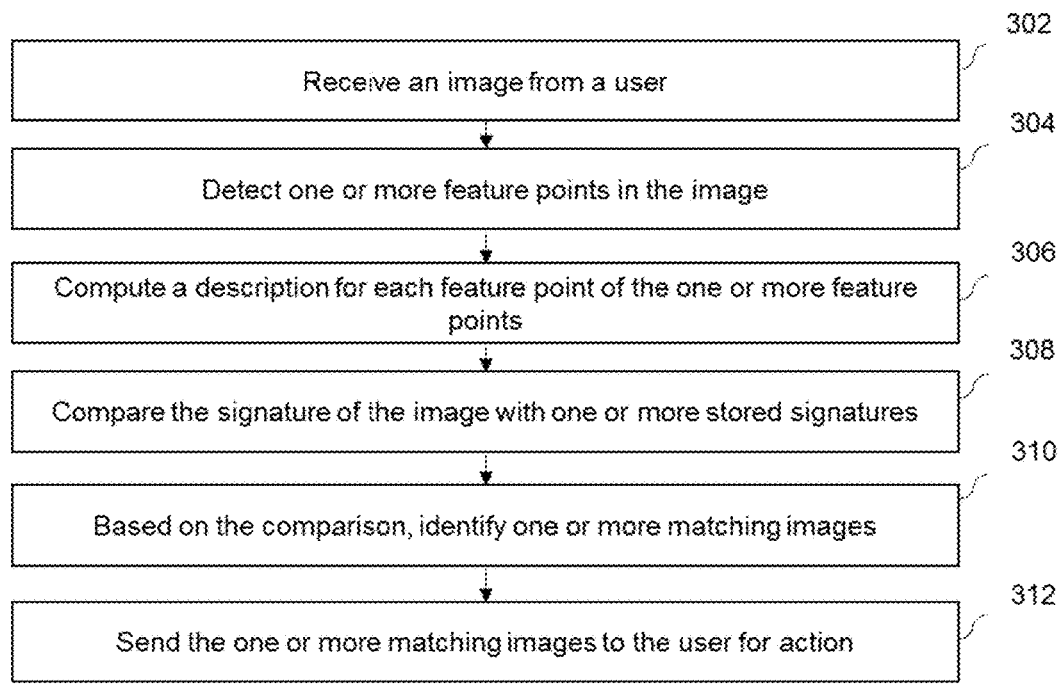
FIG. 3 is a method flowchart for recognizing objects based on one or more stored training images.

FIG. 3 is a method flowchart for recognizing an object in one or more input images according to an embodiment. The primary purpose of the method is to identify one or more matching images that match an input image.

The method begins at 302, with receiving an input image from the user 102. The input image may be an image of a product, an item, a person, a building, a logo or a trademark and may be input in any suitable format as known in the art or later developed. On receiving the input image, the feature detection unit 204 detects one or more feature points (such as corners, interest point, ridges and blobs) of the input image at 304. Thereafter, at 306, a description for each feature point of the one or more feature points is computed using the feature description unit 206 (as discussed in FIG. 2 and will be discussed in detail in FIG. 4). The combination of descriptions of all the feature points detected in the input image is called the signature of the input image. The signature of the input image helps matching the input image with the set of training images stored in the data storage 208.

At 308, the signature of the input image is matched with one or more signatures stored over the network 108. The one or more signatures correspond to one or more training images stored over the network 108 i.e., the server 106. In particular, the signature of the input image is compared with the training feature descriptors to identify one or more matching images. As described above, the search engine 212 performs the matching in two stages—a) sparse matching and b) dense matching using the index mapping.

Based on the matching, the one or more matching images are identified at 310. Once identified, the one or more matching images are sent to the user 102, at 312. The user 102 can take an action on the matching images as discussed above.

In some embodiments, the method may be implemented in any suitable hardware, software, firmware, or combination thereof, that exists in the related art or that is later developed.

Exemplary Method Flowchart—Feature Description Computation

Figure 4:
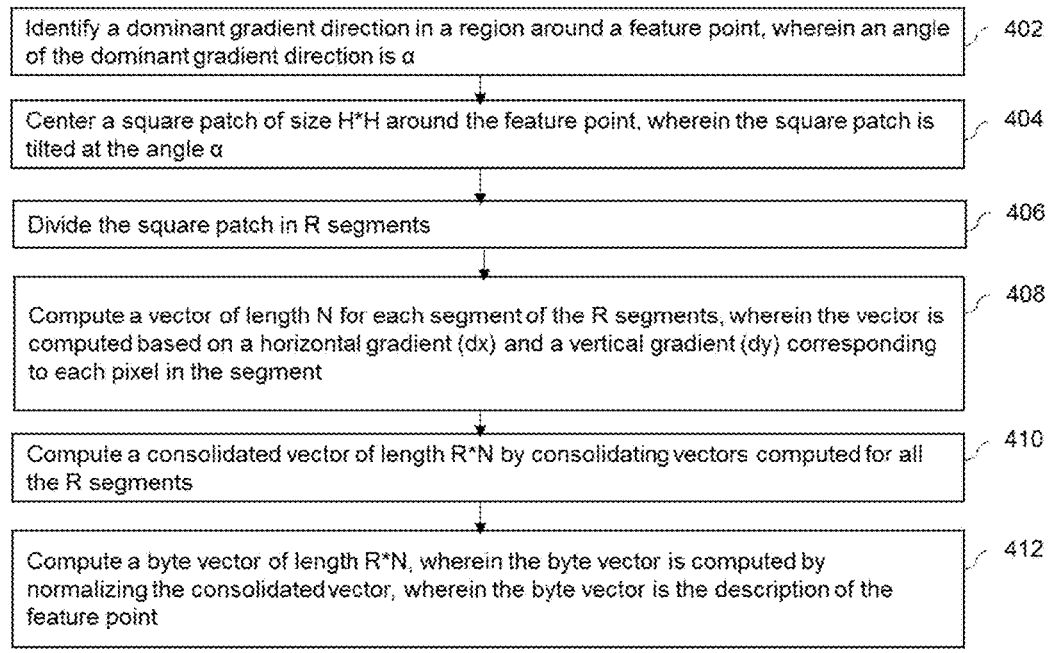
FIG. 4 is a method flowchart for computing description of each feature point of an input image, according to an embodiment.

FIG. 4 is a method flowchart for recognizing an object in one or more input images based on one or more training images stored in the data storage 208. The method flowchart of FIG. 4 primarily focuses on feature description computation of the input image. The description computation includes one or more steps which will be discussed here in detail.

Initially, one or more features points of an input image are detected. Once detected, description of each feature point of the one or more feature points is computed. In some embodiments, size associated with the description of the feature point is compacted, the size corresponds to memory required to store the description of the feature point.

To this end, a dominant gradient direction in a region around a feature point is identified at 402, an angle of the dominant gradient direction is $\alpha$. Then, a square patch of size H*H is centered on the feature point at 404, the square patch is tilted at the angle $\alpha$. Further, the square patch is divided in R segments at 406. Then, a vector of length N for each segment of the R segments is computed at 408, the vector is computed based on at least a horizontal gradient (dx) and at least a vertical gradient (dy) corresponding to each pixel in the segment. Thereafter, at 410, a consolidated vector of length R*N is computed by consolidating vectors computed for all the R segments. This consolidated vector is normalized using L2 norm to get the normalized vector V. The normalized vector V has real values in the range of [0, 1]. Finally, at 412, the vector V is then multiplied by 255 and rounded off to get a byte vector of length N*R, where each element of the vector is an integer in the range [0, 255]. The byte vector is the description of the feature point. Similarly, feature descriptions are computed for all the feature points detected in the input image of the object. The combination of all the feature descriptions corresponding to the one or more feature points detected in the input image is referred to as the signature of the input image. In this manner, the signature of the input image is generated.

Once the signature of the input image is generated, the signature of the input image is compared with training feature descriptors to identify a matching image. The matching image is then sent to the user 102 for an action, as described above.

In additional embodiments, the method includes the step of storing a set of training images; each training image of the set of training images is associated with the one or more training feature descriptors. An index mapping is created based training feature descriptors for fast processing. In some embodiments, the index mapping may be a data structure of the group comprising an array, a hash table, a lookup table and k-dimensional (k-d) tree. In cases where the index mapping is in the form of k-dimensional (k-d) tree, an additional step of pruning the k-dimensional (k-d) tree is performed. The storing of the set of training images help builds a database of the images against which the input image is matched.

For a person skilled in the art, it is understood that the method steps described above are exemplary and can be performed in any manner in order to identify the object in an image or an image itself.

The method flowchart of FIG. 4 may be implemented in any suitable hardware, software, firmware, or combination thereof, that exists in the related art or that is later developed.

Embodiments described in the present disclosure can be implemented by any system having a processor and a non-transitory storage element coupled to the processor, with encoded instructions stored in the non-transitory storage element. The encoded instructions when implemented by the processor configure the system to recognize objects based on one or more training images as discussed above in FIGS. 1-4. Non-transitory storage element/media exclude media such as energy, carrier signals, electromagnetic waves, and signals per se. The system shown in FIGS. 1 and 2 can practice all or part of the recited methods (FIGS. 3 and 4), can be a part of the recited systems, and/or can operate according to instructions in the non-transitory storage element. The non-transitory storage element can be accessed by a general purpose or special purpose computer, including the functional design of any special purpose processor. Few examples of such non-transitory storage element can include RAM, ROM, EEPROM, CD-ROM or other optical disk storage or other magnetic. The processor and non-transitory storage element (or memory) are known in the art, thus, any additional functional or structural details are not required for the purpose of the current disclosure.

Exemplary User Interface

Figure 7:
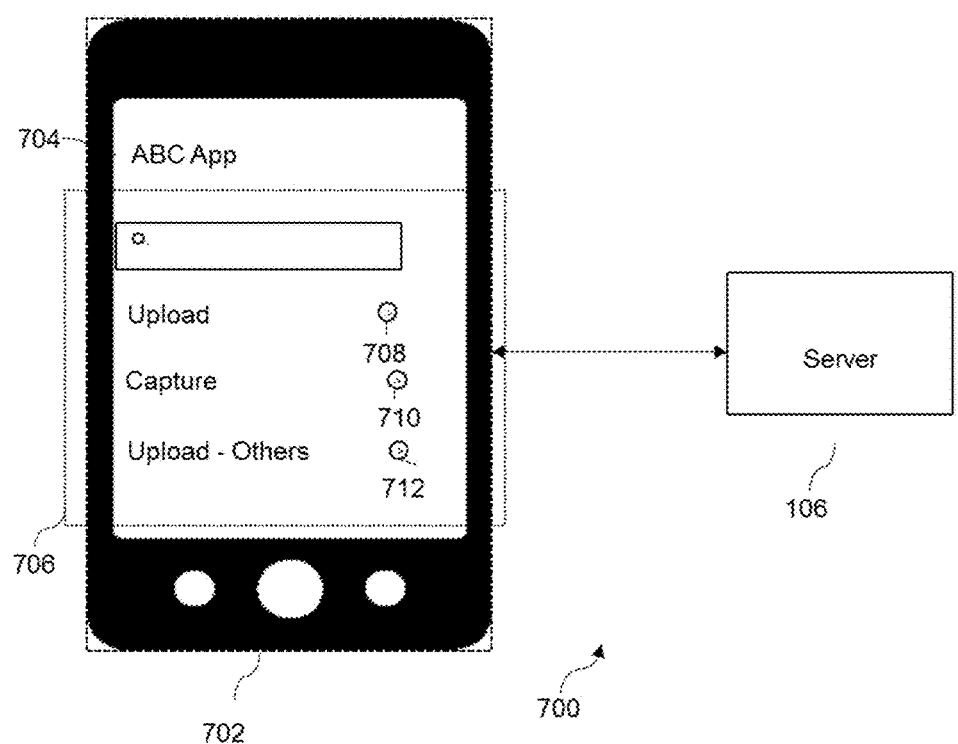
FIG. 7 shows a user interface for uploading an input image, according to an exemplary embodiment.

FIG. 7 shows an exemplary snapshot 700 of a mobile device 702 indicating the object recognition application 110, for example, ABC app 704 running on the mobile device 702. The app 704 shows an exemplary interface 706 using which the user 102 uploads an image i.e., an input image. As indicated, the image can be uploaded using various options—An Upload 708 option allows the user 102 to upload the input image which is already stored in the mobile device 702 i.e., an internal memory or in a memory card. In another example, the input image can be uploaded after capturing the image using the option Capture 710. Other options (indicated by 712) for uploading the input image are provided to the user 102, for example via a third party interface, website or the like. Once the input image is uploaded successfully, the input image is sent to the server 106 via a network (although not shown in FIG. 7). The server 106 matches the input image against the one or more training images stored in the server 106 or the data storage 208 of the server 106.

Exemplary Matched Images

Figure 8:
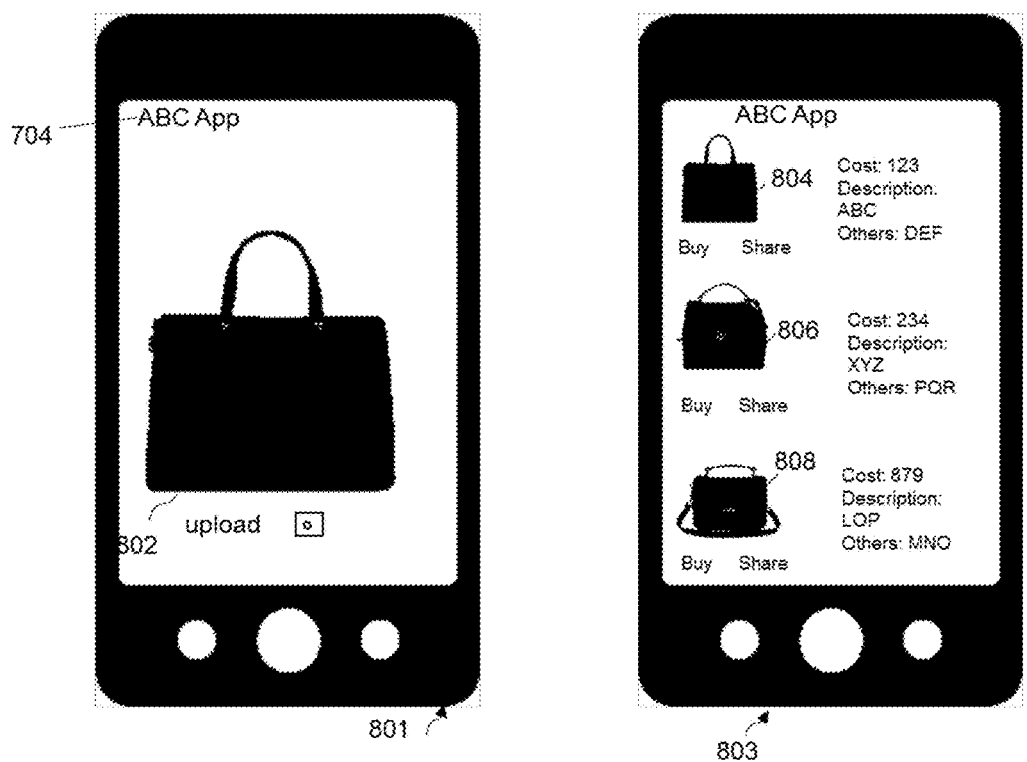
FIG. 8 illustrates snapshots indicating an exemplary input image and one or more matching images identified by an object recognition system of the present disclosure.

Referring to FIG. 8, it can be considered that the user 102 uploads an input image of a product 802 (snapshot 801) using the ABC app 704. Once uploaded, the server 106 identifies one or more matching images and displays those images/products such as 804, 806, and 808 to the user 102. The products 804, 806, 808 similar to the input product 802 are displayed to the user 102 as shown in the snapshot 803. Once displayed, the user 102 may buy any of these products 804, 806 and 808. In another example, the user 102 may share the matching images with other users through social media platforms. In yet another example, the user 102 may simply view the additional information (such as cost, description, product code and seller) related to the matching images of the products.

Figure 9:
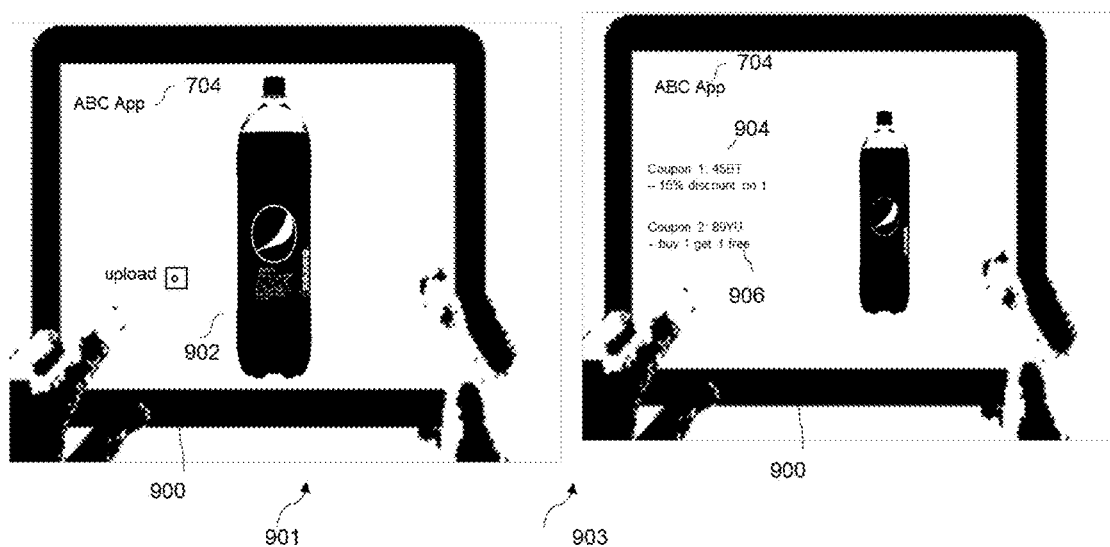
FIG. 9 illustrates snapshots indicating an exemplary input image and one or coupons identified by an object recognition system of the disclosure.

Referring to FIG. 9 (snapshot 901), it can be considered that the user 102 uploads an input image of a product 902 through the ABC app 704 to know about the coupons, offers, and discounts related to the product 902. Here, the server 106 identifies a matching image and the corresponding coupons, offers, and/or discounts. Once identified, the server 106 returns available coupons such as coupons 904, 906 to the user 102 through the interface of the app (snapshot 903). In this particular example, the user 102 uses his tablet 900 for searching the product as shown in FIG. 9.

Figure 10:
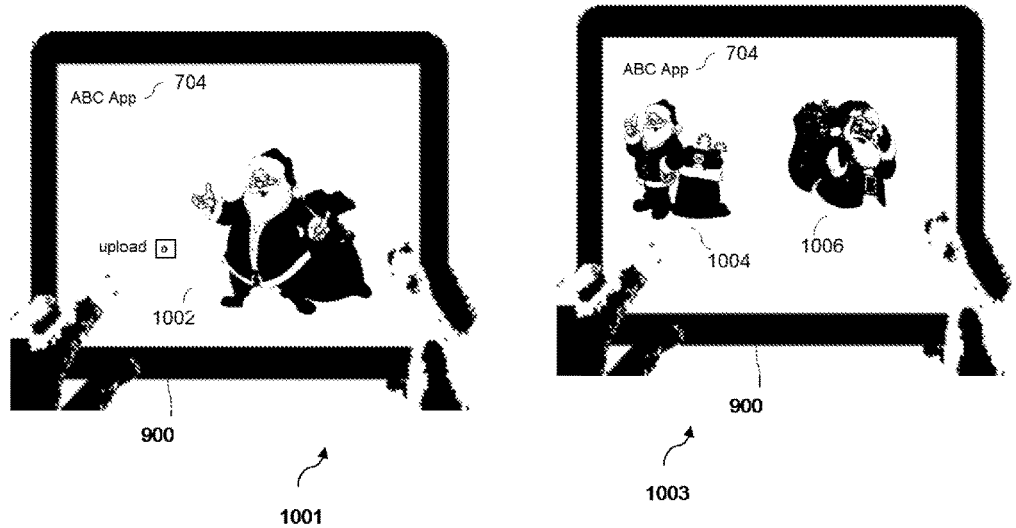
FIG. 10 illustrates snapshots showing an exemplary input image and one or matching images identified by an object recognition system of the disclosure.

Referring to FIG. 10, the user 102 uploads an input image through the user interface of the object recognition app 704 and would like to see similar images stored in his or her device—i.e., the tablet 900. As shown in the snapshot 1001, the user 102 uploads the image 1002. Once uploaded, the object recognition system 200 running on the tablet device 900 identifies two matching images. Based on the matching, matching images 1004, 1006 are displayed to the user 102, as shown in the snapshot 1003. It can be considered that signatures of the training images stored in the tablet 900 are already computed and saved.

Exemplary Case Scenarios (1 and 2)

The case scenario 1 is defined where the user 102 inputs an image and the input image is sent to the server 106 for identifying one or more matching images corresponding to the input image. Here, the data storage 208 of training images is maintained at server 106 and the input image is matched against the training images in the data storage 208. In other words, the object recognition system 200 is a part of the server 106. Examples of such case scenarios are shown in FIGS. 7-9.

The case scenario 2 is defined where the object recognition system 200 is a part of the computing device 104. Here, the input image is matched against training images stored in the computing device 104 of the user 102. The data storage 208 is maintained at the computing device 104. Example of such case scenario is discussed in FIG. 10. It can be considered that signatures of the training images stored in the tablet 900 are already computed and saved.

For a person skilled in the art, it is understood that these are exemplary case scenarios and exemplary snapshots just for understanding purposes, however, many variations to these can be implemented for recognizing objects.

The present disclosure can be implemented for many applications such as retail/e-commerce (retail product recognition and related e-commerce applications), security and surveillance, travel, security, data mining, monitoring, fashion brands, core app developers, market promotional activities, copyright related applications, advertisement/commercials recognition, face recognition, gaming, content management, augmented reality, image searching, social media, image classification for product search, identifying inappropriate content and many others. For a person skilled in the art, it is understood that the application areas are exemplary and the disclosure may be applicable and implemented for many other areas. The object identification system may be implemented for the visually impaired. In such cases, the matched images can be conveyed to them verbally using any know techniques or later developed.

The present disclosure discloses methods and system for recognizing an object in one or more input images based on one or more stored training images. The disclosure provides an optimized way of storing signatures of the input images. For example, the disclosure focuses on compacting signature size of the images for memory and speed optimization, thus, facilitating fast matching against millions of images. Further, the disclosure focuses on splitting the matching process into two stages, thus being able to do fast matching against millions of images. Additionally, the disclosure helps resolving differences between similar looking images and also helps elimination of false matches in a video mode.

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In general, the word "unit", as used herein, refers to logic embodied in hardware or firmware, or to a collection of software instructions, written in a programming language, such as, Java, C, or assembly. One or more software instructions in the unit may be embedded in firmware, such as EPROM. The units described herein may be implemented as either software and/or hardware modules and may be stored in any type of non-transitory computer-readable medium or other non-transitory storage elements. Some non-limiting examples of non-transitory computer-readable media include CDs, DVDs, BLU-RAY, flash memory, and hard disk drives In the drawings and specification, there have been disclosed exemplary embodiments of the disclosure. Although specific terms are employed, they are used in a generic and descriptive sense only and not for purposes of limitation, the scope of the invention being defined by the following claims. Those skilled in the art will recognize that the present invention admits of a number of modifications, within the spirit and scope of the inventive concepts, and that it may be applied in numerous applications, only some of which have been described herein. It is intended by the following claims to claim all such modifications and variations which fall within the true scope of the invention

We claim:

1. An object recognition system, comprising of:
   a processor;
   a non-transitory storage element coupled to the processor;
   encoded instructions stored in the non-transitory storage element,
   wherein the encoded instructions when implemented by the processor, configure the object recognition system to:
   generate a signature for an input image of an object by an image signature generation unit, wherein the image signature generation unit is further comprising of:
   a feature detection unit configured to detect one or more feature points in the input image; and
   a feature description unit configured to compute a description for each feature point of the one or more the feature points, wherein the feature description unit is further configured to:
   identify a dominant gradient direction in a region around the feature point, wherein an angle of the dominant gradient direction is $\alpha$;
   center a patch around the feature point, wherein the patch is tilted at the angle $\alpha$;
   divide the patch in R segments;
   compute a vector of length N for each segment of the R segments, wherein the vector is computed based on a horizontal gradient (dx) and a vertical gradient (dy) corresponding to each pixel in the segment;
   compute a consolidated vector of length R*N by consolidating vectors computed for all the R segments; and
   compute a byte vector of length R*N, wherein the byte vector is computed by normalizing the consolidated vector, wherein the byte vector is the description of the feature point;
   whereby, the signature of the input image comprises the description corresponding to each of the one or more feature points in the input image;
   store the set of training images in a data storage, wherein each training image of the set of training images is associated with one or more training feature descriptors, the data storage further comprising:
   an index mapping unit configured to create an index mapping based on training feature descriptors; and
   identify a matching image of the set of training images by a search engine comparing the signature of the input image with the training feature descriptors using the index mapping.

2. The object recognition system of claim 1, wherein the object recognition system is a part of at least one of the group comprising a mobile phone, a computer and a server.

3. The object recognition system of claim 1 further comprising of a compactor unit configured to compact a size associated with the description of the feature point, wherein the size corresponds to memory required to store the description of the feature point.

4. The object recognition system of claim 1, wherein the index mapping is at least one data structure of the group comprising an array, a hash table, a lookup table and k-dimensional (k-d) tree.

5. The object recognition system of claim 4, wherein the index mapping unit is further configured to prune the k-dimensional (k-d) tree.

6. The object recognition system of claim 1, wherein the search engine is further configured to compare the signature of the input image with the one or more training feature descriptors of a training image of the set of the training images using spatial consistency.

7. The object recognition system of claim 6, wherein the search engine is further configured to compute a spatial transformation between the input image and the training image.

8. The object recognition system of claim 7, wherein the search engine is further configured to compute a matching score between the input image and the training image.

9. The object recognition system of claim 1, wherein the data storage is further configured to cluster the set of training images into Similar Image Clusters (SICs).

10. The object recognition system of claim 1, the input image is a frame of a video.

11. The object recognition system of claim 10, wherein the search engine is further configured to perform a temporal verification check on the matching image.

12. The object recognition system of claim 1, further comprising a compactor unit configured to compact a size associated with the description of the feature point, wherein the size corresponds to memory required to store the description of the feature point; and
    the processor computes the index mapping of the feature points based on the training feature descriptors.

13. A method for recognizing an object in one or more input images based on one or more training images stored in a data storage, the method comprising;
    generating a signature for an input image of the object comprising;
    detecting one or more feature points in the input image; and
    computing the description for each feature point of the one or more feature points, comprising:
    identifying a dominant gradient direction in a region around a feature point, wherein an angle of the dominant gradient direction is $\alpha$;
    centering a patch around the feature point, wherein the patch is tilted at the angle $\alpha$;
    dividing the patch in R segments;
    computing a vector of length N for each segment of the R segments, wherein the vector is computed based on at least a horizontal gradient (dx) and at least a vertical gradient (dy) corresponding to each pixel in the segment
    computing a consolidated vector of length R*N by consolidating vectors computed for all the R segments; and computing a byte vector of length R*N, wherein the byte vector is computed by normalizing the consolidated vector, wherein the byte vector is the description of the feature point;

whereby, the signature of the input image comprises the description corresponding to each of the one or more feature points in the input image; and identifying a matching image of the set of training images by comparing the signature of the input image with training feature descriptors of the set of training images using an index mapping.

14. The method for recognizing an object of claim 13, wherein the index mapping is at least one data structure of the group comprising an array, a hash table, a lookup table and k-dimensional (k-d) tree.

15. The method for recognizing an object of claim 14 further comprising pruning the k-dimensional (k-d) tree.

16. The method for recognizing an object of claim 13 further comprising comparing the signature of the input image with the training feature descriptors of the set of training images using spatial consistency.

17. The method for recognizing an object of claim 16 further comprising computing a spatial transformation between the input image and a training image of the set of training images.

18. The method for recognizing an object of claim 17 further comprising computing a matching score between the input image and the training image of the set of training images.

19. The method for recognizing an object of claim 13 further comprising clustering the set of training images into Similar Image Clusters (SICs).

\* \* \* \* \*